(12) United States Patent
Lange et al.

(10) Patent No.: US 9,434,337 B2
(45) Date of Patent: *Sep. 6, 2016

(54) VEHICLE DOOR ENGAGEMENT DETECTION

(71) Applicant: GM GLOBAL TECHNOLOGY OPERATIONS LLC, Detroit, MI (US)

(72) Inventors: Richard J. Lange, Troy, MI (US); David T. Proefke, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/256,363

(22) Filed: Apr. 18, 2014

(65) Prior Publication Data

US 2015/0300046 A1     Oct. 22, 2015

(51) Int. Cl.
| | | |
|---|---|---|
| B60R 22/00 | (2006.01) | |
| G08B 19/00 | (2006.01) | |
| E05C 3/06 | (2006.01) | |
| B60R 21/02 | (2006.01) | |
| E05B 77/48 | (2014.01) | |
| E05B 81/64 | (2014.01) | |
| B60Q 5/00 | (2006.01) | |
| B60Q 1/50 | (2006.01) | |

(52) U.S. Cl.
CPC .............. *B60R 21/02* (2013.01); *E05B 77/48* (2013.01); *E05B 81/64* (2013.01); *B60Q 1/50* (2013.01); *B60Q 5/005* (2013.01)

(58) Field of Classification Search
USPC .............................. 701/49; 340/521; 292/216
See application file for complete search history.

(56) References Cited

U.S. PATENT DOCUMENTS

| | | | | |
|---|---|---|---|---|
| 6,102,453 | A * | 8/2000 | Cetnar ..................... | E05B 81/06 292/199 |
| 6,701,671 | B1 * | 3/2004 | Fukumoto et al. ............. | 49/280 |
| 2002/0021010 | A1 * | 2/2002 | Hirota ..................... | E05B 77/48 292/201 |
| 2003/0052490 | A1 * | 3/2003 | Willats ..................... | E05B 81/76 292/216 |
| 2003/0222758 | A1 * | 12/2003 | Willats ..................... | B60R 25/04 340/5.72 |
| 2005/0146147 | A1 * | 7/2005 | Niskanen ............... | E05B 47/0009 292/336.3 |
| 2006/0181152 | A1 * | 8/2006 | Taurasi ................... | B60R 25/00 307/10.2 |
| 2006/0241836 | A1 * | 10/2006 | Kachouh ............ | B60H 1/00742 701/49 |
| 2006/0254142 | A1 * | 11/2006 | Das et al. ......................... | 49/26 |
| 2007/0210588 | A1 * | 9/2007 | Cetnar ..................... | E05B 77/26 292/216 |
| 2007/0252407 | A1 * | 11/2007 | Cavallucci .............. | E05B 81/90 296/146.4 |
| 2007/0284892 | A1 * | 12/2007 | Nozawa ........................ | 292/216 |
| 2008/0001412 | A1 * | 1/2008 | Nozawa et al. .................... | 292/2 |
| 2008/0012355 | A1 * | 1/2008 | Fujimatsu ............... | E05B 83/36 292/216 |
| 2008/0224482 | A1 * | 9/2008 | Cumbo ................... | E05B 77/02 292/216 |
| 2009/0027188 | A1 * | 1/2009 | Saban ..................... | B60N 2/002 340/521 |
| 2010/0235059 | A1 * | 9/2010 | Krishnan ................ | E05B 81/14 701/49 |
| 2012/0234621 | A1 * | 9/2012 | Syvret ................. | E05F 15/1684 180/281 |
| 2012/0323471 | A1 * | 12/2012 | Krishnan ................ | E05B 77/26 701/112 |
| 2014/0025261 | A1 * | 1/2014 | Mayer et al. ................... | 701/48 |
| 2014/0277938 | A1 * | 9/2014 | Utter ...................... | E05B 77/14 701/36 |
| 2014/0319847 | A1 * | 10/2014 | Uehara ................... | E05B 77/26 292/97 |

* cited by examiner

*Primary Examiner* — Thomas G Black
*Assistant Examiner* — Tyler Paige
(74) *Attorney, Agent, or Firm* — Lorenz & Kopf, LLP

(57) ABSTRACT

Methods and systems are provided for implementing door engagement detection for a vehicle. A sensor is configured to detect when an apparatus of a door of a vehicle is engaged from inside the vehicle. A processor is coupled to the sensor, and is configured to at least facilitate providing a notification if the apparatus of the door is engaged from inside the vehicle.

9 Claims, 4 Drawing Sheets

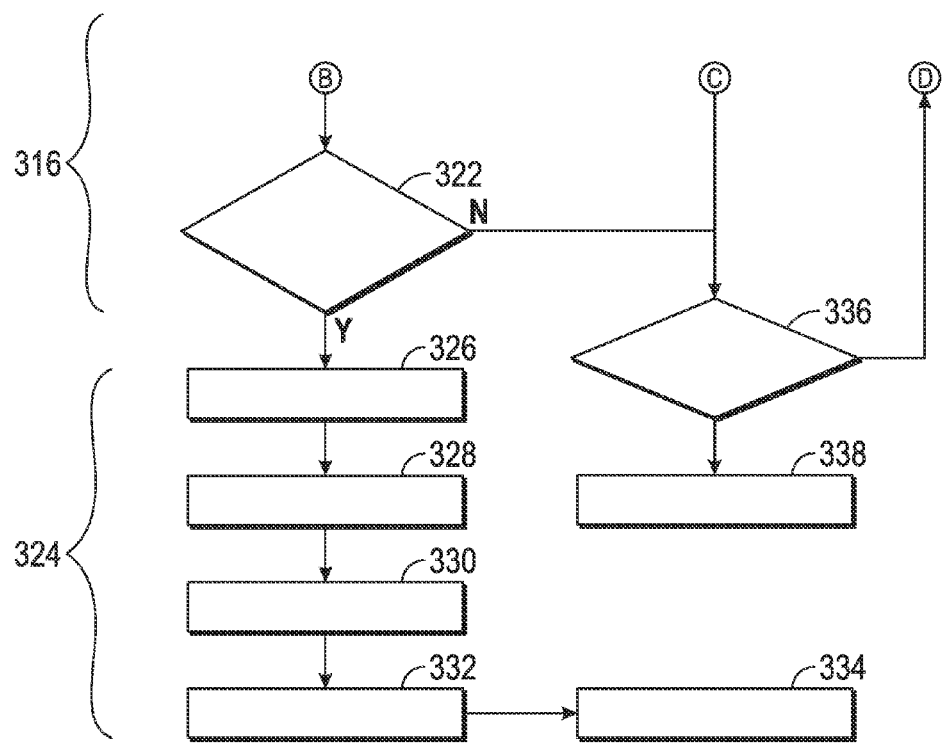
FIG. 3 (con.)

VEHICLE DOOR ENGAGEMENT DETECTION

TECHNICAL FIELD

The present disclosure generally relates to the field of vehicles and, more specifically, to methods and systems for detecting and acting upon engagement of vehicle doors, such as while a rear child safety lock is activated.

BACKGROUND

Certain vehicles today have one or more child safety features, such as child locks. For example, when activated, a child lock may prevent a child from opening a rear car of the vehicle. However, there may be situations in which additional protections may be desired, for example if a child requires assistance with exiting a vehicle.

Accordingly, it is desirable to provide improved techniques for providing such additional protections, for example if a child requires assistance with exiting a vehicle. It is also desirable to provide methods, systems, and vehicle utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises detecting, using a sensor, when an apparatus of a door of a vehicle is engaged from inside the vehicle, and providing, using a processor, a notification if the apparatus of the door is engaged from inside the vehicle.

In accordance with another exemplary embodiment, a method is provided. The method comprises determining whether a child lock of a vehicle is activated, determining whether a condition for the vehicle is satisfied, the condition selected from the group consisting of: an alarm of the vehicle has been set, the vehicle has been stopped, and all doors of the vehicle have been locked, and deactivating the child lock a predetermined amount of time after the condition has been satisfied.

In accordance with another exemplary embodiment, a system is provided. The system comprises a sensor and a processor. The sensor is configured to detect when an apparatus of a door of a vehicle is engaged from inside the vehicle. The processor is coupled to the sensor, and is configured to at least facilitate providing a notification if the apparatus of the door is engaged from inside the vehicle.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
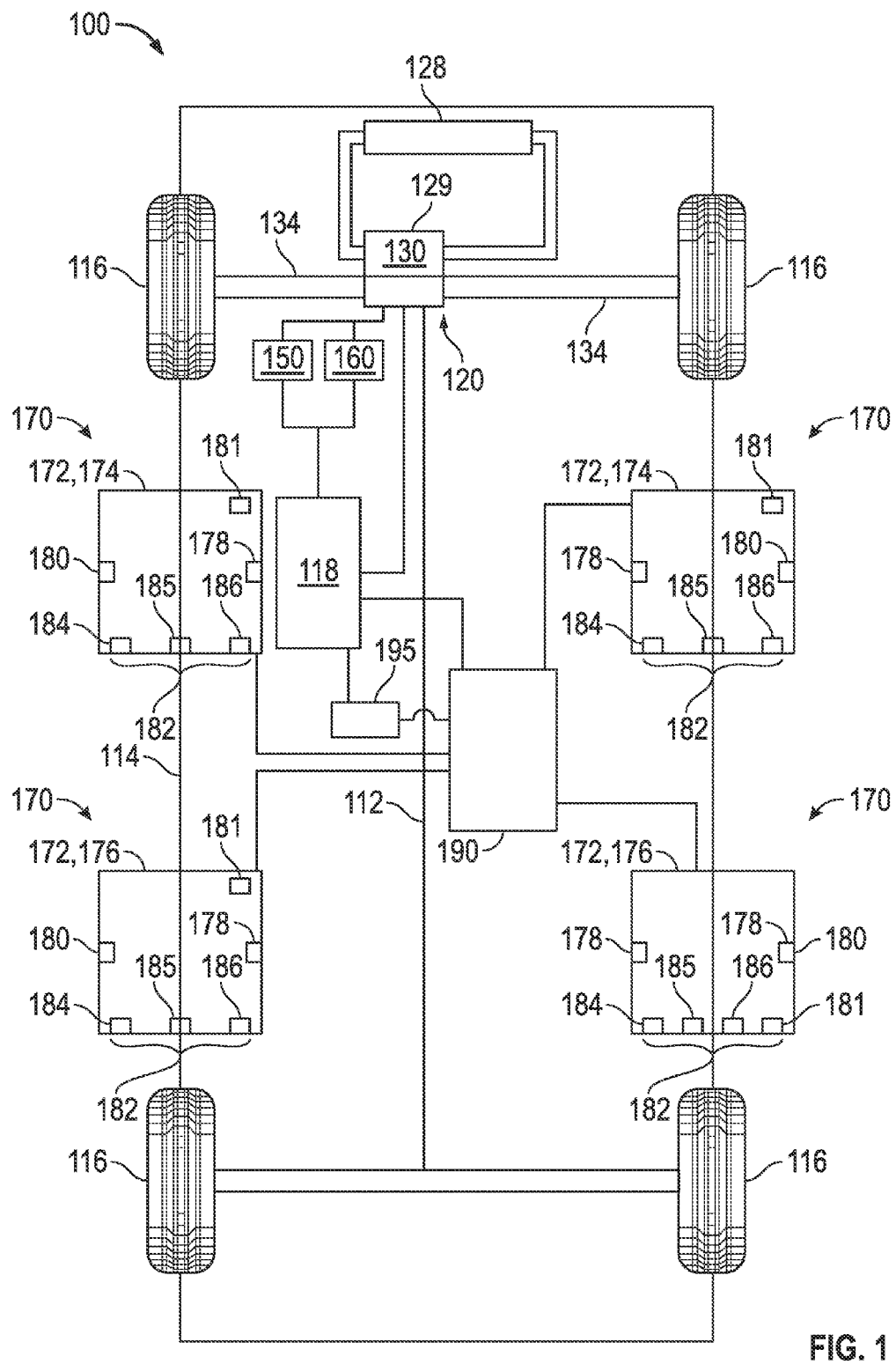
FIG. 1 is a functional block diagram of a vehicle that includes a control system for doors of the vehicle, in accordance with an exemplary embodiment.

FIG. 1 illustrates a vehicle 100, or automobile, according to an exemplary embodiment. As described in greater detail further below, the vehicle 100 includes a control system 190 that provides for implementation of vehicle door engagement detection for doors 170 of the vehicle 100. Specifically, as discussed in further detail below in connection with FIG. 1, as well as further below in connection with FIGS. 2 and 3, in certain embodiments the control system 190 provides appropriate notifications and/or takes appropriate actions when it detects that an apparatus (e.g., interior handle 178 or locking mechanism 182) of a door 170 is engaged from inside the vehicle 100 under certain circumstances (e.g., when the vehicle 100 is parked, the doors 170 are locked, and/or a vehicle alarm 195 is set) and/or after a predetermined amount of time has elapsed after the circumstances are satisfied. As used throughout this Application, an apparatus is considered to be engaged from "inside" the vehicle when it is engaged from a cabin of the vehicle in which a driver or passenger may be positioned, for example, a front row of the vehicle, one or more rear rows of the vehicle, and/or a hatch or storage region behind the rear rows.

With reference again to FIG. 1, the vehicle 100 includes a chassis 112, a body 114, four wheels 116, an electronic control system 118, a steering system 150, a braking system 160, and the above-referenced doors 170 and control system 190. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 includes an actuator assembly 120 and a radiator 128. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission.

The radiator 128 is connected to the frame at an outer portion thereof. Although not illustrated in detail, the radiator 128 includes multiple cooling channels therein that contain a cooling fluid (i.e., coolant) such as water and/or ethylene glycol (i.e., "antifreeze"), and is coupled to the engine 130.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lightning units, navigation systems, and the like (also not depicted).

The doors 170 can be coupled to the body 114 of the vehicle 100, and can permit ingress and egress from a cabin defined by the body 114 of the vehicle 100 as well known to those skilled in the art. The doors 170 can include, but are not limited to, front doors 172 and rear doors 174. The doors 170 may be opened via one or more interior handles 178 (disposed inside the vehicle) or exterior handles 180 (disposed outside the vehicle). Each of the doors 170 can include one or more locking mechanisms 182. Each locking mechanism 182 can be any suitable mechanism, including, but not limited to, a mechanical device or an electrical device (e.g. activated by a locking switch), suitable for securing the door 170 to the body 114 to prevent access to and/or from the cabin of the vehicle 100. As depicted in FIG. 1, the locking mechanisms 182 may include a power lock switch 184 that can electrically lock and unlock one or more of the doors 170 upon activation. Also as depicted in FIG. 1, the locking mechanisms 182 may include a manual lock switch and/or knob 185 that can manually unlock one of the doors 170 upon activation. In addition, as depicted in FIG. 1, the locking mechanisms 182 may include one or more child lock switches 186 that can manually un-child lock the doors 170 (i.e., so that the child lock no longer prevents opening of the door) when the door 170 is open. In addition, also as depicted in FIG. 1, the locking mechanisms 182 may include one or more latches 181. In certain embodiments, the latches 181 may be coupled to one or more of the lock switches 184, 185, and/or 186, and may be used by individuals (e.g., occupants inside the vehicle 100) for engaging, activating, and/or deactivating the one or more lock switches 184, 185, and/or 186. In one embodiment, each latch 181 may be considered to have three states, namely: (i) a locked state, in which the door 170 is locked and the door handles 178, 180 will not open the door 170; (ii) an unlocked state, in which the door 170 is unlocked and can be opened by both door handles 178, 180; and (iii) a child locked state, in which the door 170 can be opened by the exterior door handle 180 but not by the interior door handle 178. Also in one embodiment, In one example, a user may lock or unlock the doors 170 via a remote system, such as a fob 187, In one example, the fob 187 can include one or more user input devices 188 and a transmitter 189. In the case of an "active" entry system, the user input devices 188 can be actuated by an operator to generate a signal to lock or unlock one or more of the doors 170 of the vehicle 100. The signals generated by the actuation of the user input devices 188 can be transmitted by the transmitter 189 over a suitable wireless link to a receiver of the control system 190 (such as transceiver 220 of FIG. 2). Alternatively, in the case of a "passive" entry system, the transmitter 189 can transmit a signal to the receiver when the fob 187 has left a predetermined zone associated with the vehicle 100, such as, but not limited to, about 15 feet from the vehicle 100. The receiver can receive the signals from the transmitter 189 of the fob 187.

The alarm 195 can be configured to provide a notification when a third party attempts to enter a vehicle without authorization (e.g. without a proper key or fob). For example, the alarm 195 may provide audible notifications (e.g. a honking horn noise and/or other loud noises) and/or visual notifications (e.g. flashing lights), and/or may transmit notifications via a transceiver (for example, to a central server and/or security monitoring station) when it is detected that a third party may be attempting to enter the vehicle 100 without authorization (e.g. when glass of a window or windshield of the vehicle 100 is broken and/or the vehicle 100 is otherwise tampered with) while the alarm 196 is turned on. In one exemplary embodiment, the alarm 195 is turned on a predetermined amount of time (e.g., 30 seconds, although the amount of time may vary in different embodiments) after each of the doors of the vehicle are turned off with the vehicle's ignition turned off. In another exemplary embodiment, the alarm 195 is turned on a predetermined amount of time (e.g., 30 seconds, although the amount of time may vary in different embodiments) after a vehicle user holding a keyfob for the vehicle has left the keyfob's transmission range with respect to the vehicle with the vehicle's ignition turned off. As depicted in FIG. 1, the alarm 195 may be coupled to the electronic control system 118 and/or the control system 190 in various embodiments.

The control system 190 is mounted on the chassis 112. As mentioned above, the control system 190 provides for implementation of vehicle door engagement detection for doors 170 of the vehicle 100. Specifically, the control system 190 provides appropriate notifications and/or actions that can help provide assistance when it detects that an apparatus (e.g., interior handle 178 or locking mechanism 182) of one of the doors 170 is engaged from inside the vehicle 100 under certain circumstances (e.g., when the vehicle 100 is parked, the doors 170 are locked, and/or the vehicle alarm 195 is set), and/or after a predetermined amount of time has elapsed after the circumstances are satisfied. This can help to provide assistance, for example, when one or more occupants may be having difficulty getting out of the vehicle 100 (for example, if a child has inadvertently been left inside the vehicle 100 after parents or other adults have left the vehicle 100). The control system 190 preferably performs these functions in accordance with the process 300 discussed further below in connection with FIG. 3. The control system 190 may comprise all or part of, and/or may be coupled to, various other vehicle devices and systems, such as, among others, the actuator assembly 120, the electronic control system 118, and/or the doors 170.

Figure 2:
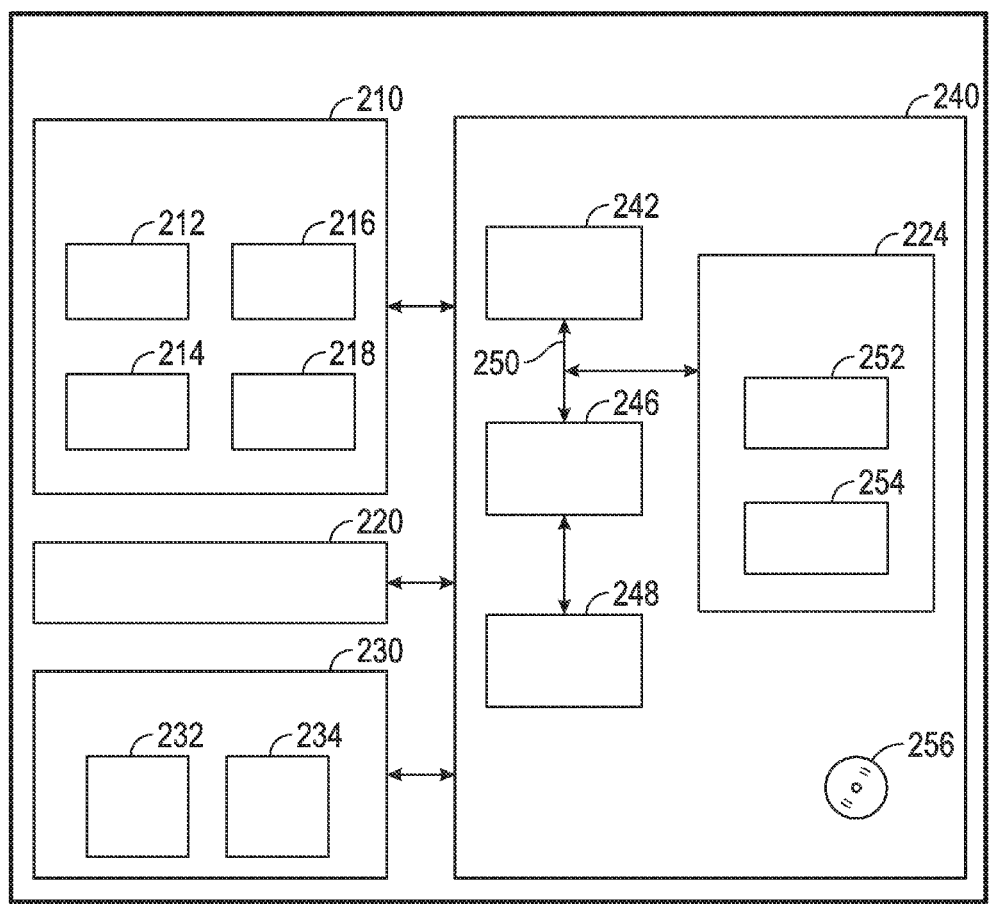
FIG. 2 is a functional block diagram of a control system for vehicle doors that can be used in connection with the vehicle of FIG. 1, in accordance with an exemplary embodiment.

With reference to FIG. 2, a functional block diagram is provided for the control system 190 of FIG. 1, in accordance with an exemplary embodiment. The control system 190 includes a sensor array 210, one or more transceivers 220, a notification unit 230, and a controller 240.

As depicted in FIG. 2, the sensor array 210 includes one or more door handle sensors 212, one or more lock sensors 214, one or more transmission sensors 216, and one or more speed sensors 218. Each door handle sensor 212 detects whether an interior handle 178 of a corresponding one of the doors 170 is engaged (preferably detecting whether an interior handle 178 is engaged fro inside the vehicle 100). The transmission sensor(s) 216 detect a gear or transmission state of the vehicle 100 (e.g. whether the vehicle is in park, drive, reverse). The lock sensors 214 detect whether one or more locking mechanisms 182 of the vehicle 100 have been engaged (preferably detecting whether one of the latches 181, power lock switches 184, manual lock switches 185, and/or child lock switches 186 have been engaged from inside the vehicle 100).

The transceiver 220 communicates with devices of one or more users of the vehicle and/or with one or more third parties (for example via a central server). In one embodiment, the transceiver 220 communicates with the fob 187 of FIG. 1, for example in receiving and implementing lock and unlock requests for the doors 170 and for determining whether the fob 187 is within a predetermined distance or range of the vehicle. In certain embodiments, the transceiver 220 also provides notifications to a cellular telephone, smart phone, computer, tablet, and/or other device of the vehicle user when an apparatus pertaining to one of the doors 170 of the vehicle (such as an interior handle 178 and/or locking mechanism 182) is engaged from inside the vehicle (such as when a child may be inadvertently left inside the vehicle while the user is away from the vehicle). The transceiver 220 may also provide such notifications to a third party, such as a central server, monitoring service, security service, law enforcement, fire department, and/or public service who may able to assist in such situations. The transceiver 220 may provide such notifications wirelessly, for example, via a short range wireless (e.g. Bluetooth™), cellular, satellite, and/or wireless network.

The notification unit 230 provides audio and/or visual notifications in proximity to the vehicle (e.g. within hearing distance and/or visual seeing distance from the vehicle). In one embodiment, the notification unit 230 provides audio and visual notifications via respective audio and visual components 232, 234 when an apparatus pertaining to one of the doors 170 of the vehicle (such as an interior handle 178 and/or locking mechanism 182) is engaged from inside the vehicle (such as when a child may be inadvertently left inside the vehicle while the user is away from the vehicle). By way of example, the audio notifications provided via the audio component 232 may include a honking of a horn, an alarm-type sound, one or more other loud noises, and/or a verbal statement indicating that a person may be trapped inside the vehicle. Also be way of example, the visual notifications provided via the visual component 234 may include flashing lights, strobe lights, and/or other visual indications to draw attention of the user and/or passers by to the vehicle.

The controller 240 is coupled to the sensor array 210, the transceivers 220, and the notification unit 230. In addition, in certain embodiments, the controller 240 is also coupled to one or more other vehicle systems (such as the electronic control system 118 of FIG. 1). The controller 240 receives the sensed information from the sensor array 210, such as the engagement of door handles and/or locks, a gear or transmission state of the vehicle, and/or a speed of the vehicle. In certain embodiments, the controller 240 also receives information from the transceiver 220, for example as to whether a user of the vehicle has left the vicinity of the vehicle). Based upon this information, the controller 240 provides appropriate notifications under appropriate circumstances, such as when it is detected that an apparatus (e.g., interior handle 178 or locking mechanism 182) of one of the doors 170 is engaged from inside the vehicle 100 under certain circumstances (e.g., when the vehicle 100 is parked, the doors 170 are locked, and/or the vehicle alarm 195 is set), and/or after a predetermined amount of time has elapsed after the circumstances are satisfied. The controller 240 preferably performs these functions in accordance with the steps of the process 300 depicted in FIG. 3 and discussed further below in connection therewith.

As depicted in FIG. 2, the controller 240 comprises a computer system. In certain embodiments, the controller 240 may also include one or more of the sensor array 210, transceiver(s) 220, notification unit 230, and/or one or more other systems. In addition, it will be appreciated that the controller 240 may otherwise differ from the embodiment depicted in FIG. 2. For example, the controller 240 may be coupled to or may otherwise utilize one or more remote computer systems and/or other control systems.

In the depicted embodiment, the computer system of the controller 240 includes a processor 242, a memory 244, an interface 246, a storage device 248, and a bus 250. The processor 242 performs the computation and control functions of the controller 240, and may comprise any type of processor or multiple processors, single integrated circuits such as a microprocessor, or any suitable number of integrated circuit devices and/or circuit boards working in cooperation to accomplish the functions of a processing unit. During operation, the processor 242 executes one or more programs 252 contained within the memory 244 and, as such, controls the general operation of the controller 240 and the computer system of the controller 240, preferably in executing the steps of the processes described herein, such as the steps of the process 300 (and any sub-processes thereof) in connection with FIG. 3.

The memory 244 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 244 is located on and/or co-located on the same computer chip as the processor 242. In the depicted embodiment, the memory 244 stores the above-referenced program 252 along with one or more stored values 254 for use in making the determinations. In one such embodiment, the stored values 254 comprise thresholds used for various determinations of the process 300 of FIG. 3 (e.g. an amount of time after an alarm is set before an action is taken).

The bus 250 serves to transmit programs, data, status and other information or signals between the various components of the computer system of the controller 240. The interface 246 allows communication to the computer system of the controller 240, for example from a system driver and/or another computer system, and can be implemented using any suitable method and apparatus. It can include one or more network interfaces to communicate with other systems or components. The interface 246 may also include one or more network interfaces to communicate with technicians, and/or one or more storage interfaces to connect to storage apparatuses, such as the storage device 248.

The storage device 248 can be any suitable type of storage apparatus, including direct access storage devices such as hard disk drives, flash systems, floppy disk drives and optical disk drives. In one exemplary embodiment, the storage device 248 comprises a program product from which memory 244 can receive a program 252 that executes one or more embodiments of one or more processes of the present disclosure, such as the steps of the process 300 (and any sub-processes thereof) of FIG. 3, described further below. In another exemplary embodiment, the program product may be directly stored in and/or otherwise accessed by the memory 244 and/or a disk (e.g., disk 256), such as that referenced below.

The bus 250 can be any suitable physical or logical means of connecting computer systems and components. This includes, but is not limited to, direct hard-wired connections, fiber optics, infrared and wireless bus technologies. During operation, the program 252 is stored in the memory 244 and executed by the processor 242.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 242) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 240 may also otherwise differ from the embodiment depicted in FIG. 2, for example in that the computer system of the controller 240 may be coupled to or may otherwise utilize one or more remote computer systems and/or other control systems.

Figure 3:
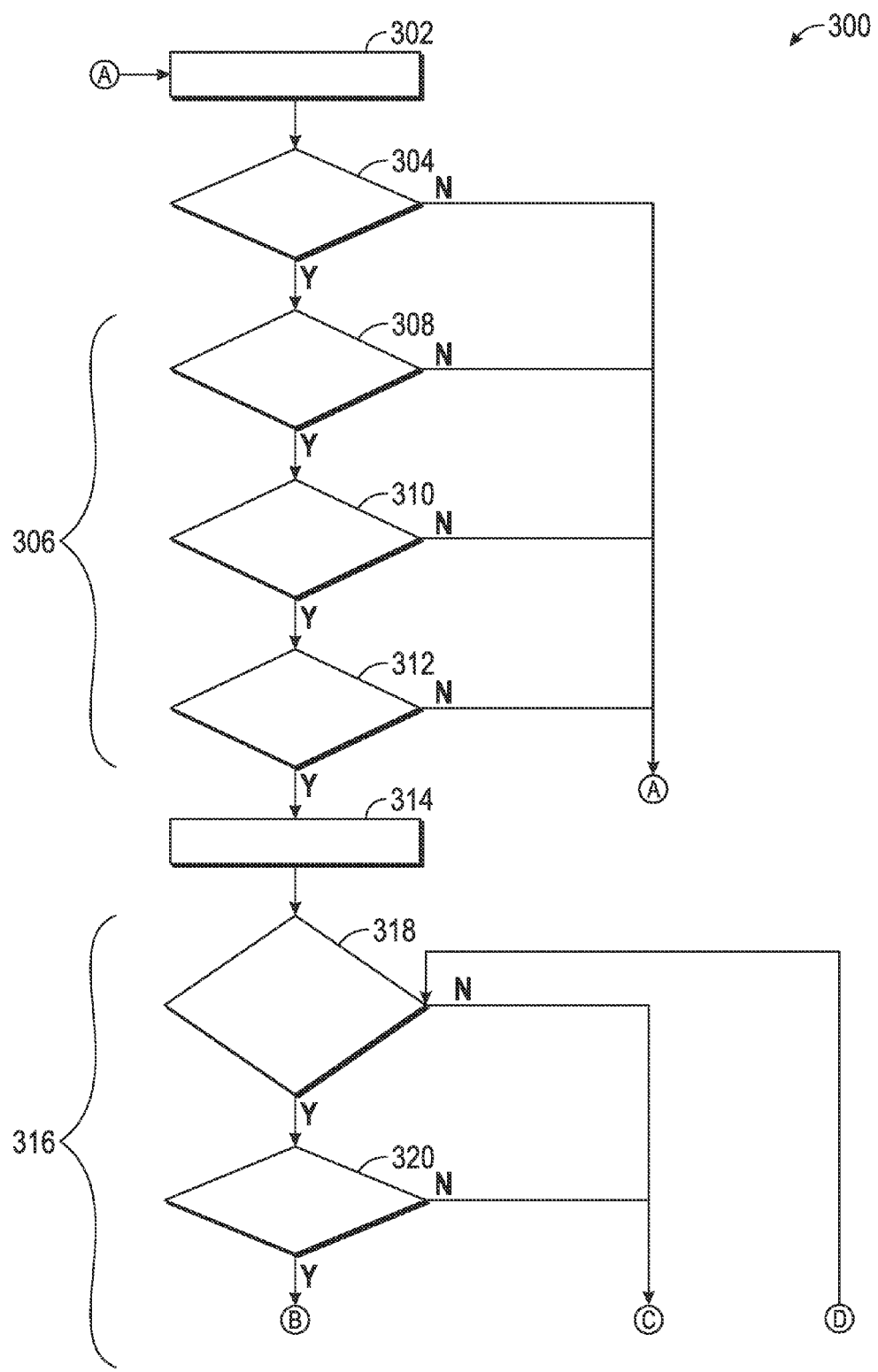
FIG. 3 is a flowchart of a process for implementing vehicle door engagement detection, and that can be used in connection with the vehicle of FIG. 1 and the system of FIG. 2, in accordance with an exemplary embodiment.

FIG. 3 is a flowchart of a process 300 for implementing vehicle door engagement detection, in accordance with an exemplary embodiment. The process can be implemented in connection with the vehicle 100 and the control system 190 of FIGS. 1-2, in accordance with an exemplary embodiment. The process 300 is preferably performed continuously during a current drive cycle (or ignition cycle) of the vehicle.

The process 300 includes the step of obtaining data (step 302). During step 302, data is preferably obtained by the processor 242 via the sensor array 210 and transceivers 220 of FIG. 2. In one embodiment, the data includes measured values from the handle sensors 212 as to whether an interior door handle 178 has been engaged from inside the vehicle, measured values from the transmission sensors 216 as to a gear or transmission state of the vehicle, measured values from the door lock sensors 214 as to whether a locking mechanism 182 has been engaged from inside the vehicle, and/or measured values from the speed sensors 218 as to a speed of the vehicle (e.g. via wheel speed sensors). In certain embodiments, the data also pertains to information whether an alarm is set, for example as may be received by the transceiver 220 and/or by a vehicle bus (not depicted), and/or as detected by one or more other, non-depicted sensors of the sensor array 210. The various measurements and/or other data are preferably provided from the respective sources to the processor 242 of FIG. 2 for processing.

A determination is made as to whether any child locks of the vehicle are child locked (step 304). The determination of step 304 preferably comprises a determination by the processor 242 of FIG. 2 as to whether the child locks 186 of FIG. 1 are child locked (i.e., whether the child lock would prevent opening the door), as detected by one or more lock sensors 214 of FIG. 2 from the data of step 302. In one embodiment, if it is determined that there are no child locks that are child locked on the vehicle, then the process returns to step 302, as new data is obtained and the process begins anew in a new iteration.

Conversely, if it is determined that at least one child lock is locked on the vehicle, then the process proceeds to sub-process 306, in which a first set of determinations are made as to whether a notification or action may be required. As depicted in FIG. 3, in one embodiment sub-process 306 comprises steps 308, 310, and 312, each of which are described in turn below.

During step 308, a determination is made as to whether a vehicle stopped condition is satisfied. This determination is preferably made by the processor 242 of FIG. 2 based on data obtained in step 302 as measured by one or more of the sensors of the sensor array 210 of FIG. 2. In one embodiment, the vehicle is determined to be stopped if a gear or transmission state of the vehicle comprises a "park" condition as measured by a transmission sensor-216 of FIG. 1. In another embodiment, the vehicle is determined to be stopped if a speed of the vehicle, as measured by or calculated from values measured by one or more speed sensors 218 of FIG. 2 (e.g., wheel speed sensors). In one embodiment, if the vehicle stopped condition is not satisfied, then the process returns to step 302, as new data is obtained and the process begins anew in a new iteration. Otherwise, in one embodiment, if the vehicle stopped condition is satisfied, the proceed proceeds to step 310, described directly below.

During step 310, a determination is made as to whether each of the doors of the vehicle is locked. This determination is preferably made by the processor 242 of FIG. 2 based on data obtained in step 302 as measured by one or more of the sensors of the sensor array 210 of FIG. 2. In one such embodiment, in step 310 a determination is made as to whether a latch 181, a power lock switch 184, and/or a manual lock switch 185 has been activated to lock the doors 170 of the vehicle, as detected by one or more lock sensors 214 of FIG. 2. In one embodiment, if the vehicle doors are not locked, then the process returns to step 302, as new data is obtained and the process begins anew in a new iteration. Otherwise, in one embodiment, if the vehicle doors are locked, the proceed proceeds to step 312, described directly below.

During step 312, a determination is made as to whether an alarm has been set for the vehicle. This determination is preferably made by the processor 242 of FIG. 2 as to whether the based on data obtained in step 302 as measured by alarm 195 of FIG. 1 has been set, as detected by one or more of the sensors of the sensor array 210 of FIG. 2, and/or as determined by information received by a transceiver 220 and/or otherwise received by the processor 242 (e.g., along a vehicle communications bus). In one embodiment, if the alarm is determined not to be set, then the process returns to step 302, as new data is obtained and the process begins anew in a new iteration. Otherwise, in one embodiment, if the alarm is determined to have been set, the proceed proceeds to step 314, described directly below.

During step 314, a timer is set. The timer is preferably set by the processor 242 of FIG. 2. Specifically, the timer is set by the processor 242 to record an amount of time that the conditions of sub-process 306 have been satisfied, to use as a possible trigger for notification or action (as described further below). The process then proceeds to sub-process 316, beginning with step 318, discussed below.

During sub-process 316, an additional set of determinations are made with respect to an engagement of an apparatus pertaining to one or more of the doors 170 of the vehicle. As depicted in FIG. 3, in one embodiment sub-process 316 comprises steps 318, 320, and 322, each of which are described in turn below.

During step 318, a determination is made as to whether an apparatus pertaining to a door 170 of the vehicle has been engaged. This determination is preferably made by the processor 242 of FIG. 2 based on data obtained in step 302 as measured by one or more of the sensors of the sensor array 210 of FIG. 2. In one embodiment, a door apparatus is determined to be engaged if a handle 178, 180 and/or locking mechanism 182 (e.g. a latch and/or lock switch) has been engaged, as detected by one or more handle sensors 212 and/or lock sensors 214 of FIG. 2. In certain embodiments, the determination of step 318 pertains only to interior handles 178 and/or interior locking mechanisms 182 (e.g., latches and/or lock/unlock switches accessible from inside the vehicle), while in other embodiments the determination may also include exterior handles 180 and/or exterior locking mechanisms (e.g. latches and/or lock/unlock switches accessible from outside the vehicle).

If it is determined in step 318 that a door apparatus has not been engaged, then the process proceeds to step 336, discussed further below. Conversely, if it is determined that a door apparatus has been engaged, then the process proceeds instead to step 320, discussed directly below.

During step 320, in certain embodiments, a determination is made as to whether the door apparatus pertains to a rear door of the vehicle. This determination is preferably made by the processor 242 of FIG. 2 based on data obtained in step 302 as measured by one or more of the sensors of the sensor array 210 of FIG. 2. In one embodiment, this determination comprises a determination of whether the door apparatus comprises a lock or handle used to lock, unlock, open, or otherwise operate one of the rear doors 176 of the vehicle 100 of FIG. 1. However, in certain embodiments this step may not be necessary, for example in embodiments in which the notification and/or action or provided upon engagement of door apparatus of front or rear doors.

In certain embodiments in which a distinction is made between engagement of a rear door apparatus versus a front door apparatus, if it is determined in step 320 that the door apparatus does not pertain to a rear door, then the process proceeds to step 336, discussed further below. Conversely, in such an embodiment in which it is determined that the door apparatus does pertain to a rear door, then the process proceeds instead to step 322, discussed directly below.

During step 322, a determination is made as to whether the door apparatus has been engaged from inside the vehicle. This determination is preferably made by the processor 242 of FIG. 2 based on data obtained in step 302 as measured by one or more of the sensors of the sensor array 210 of FIG. 2. In one embodiment, this determination comprises a determination of whether the door apparatus comprises an interior door handle 178 and/or an interior locking mechanism 182 (for example, a latch 181, a power lock switch 184, and/or a manual lock switch 185 accessible from inside the vehicle). In certain embodiments this step may not be necessary, for example if the determination of step 318 only applied to interior door handles 178 and interior locking mechanisms 182.

In one embodiment, if it is determined in step 322 that the door apparatus was not engaged from inside the vehicle, then the process proceeds to step 336, discussed further below. Conversely, if it is determined that the door apparatus has been engaged from inside the vehicle, then the process proceeds instead to sub-process 324, beginning with step 326, discussed directly below.

During sub-process 324, one or more notifications and/or alerts are provided. Specifically, if the first condition(s) of sub-process 306 and a door engagement condition of sub-process 316 has also been satisfied, one or more notifications and/or alerts are provided, for example to help facilitate assistance for anyone (e.g. children) who may have inadvertently been left in the vehicle. As depicted in FIG. 3, in one embodiment sub-process 324 comprises steps 326, 328, 330, and 332, each of which are described in turn below.

During step 326, an audio notification is provided. The audio notification is preferably provided via instructions provided by the processor 242 of FIG. 2 to the audio component 232 of the notification unit 230 of FIG. 2. In one embodiment, the audio notifications provided via the audio component 232 may include a honking of a horn, an alarm-type sound, one or more other loud noises, and/or a verbal statement indicating that a person may be trapped inside the vehicle.

During step 328, a visual notification is provided. The audio notification is preferably provided via instructions provided by the processor 242 of FIG. 2 to the visual component 234 of the notification unit 230 of FIG. 2. In one embodiment, the audio notifications provided via the visual component 234 may include flashing lights, strobe lights, and/or other audio indications to draw attention of the user and/or passers by to the vehicle.

During step 330, a communication is provided to a user of the vehicle. In one embodiment, the communication is provided to a driver, owner, and/or other user of the vehicle via instructions provided by the processor 242 of FIG. 2 to the transceiver 220 of FIG. 2 to transmit a telephone call, text message, e-mail, and/or one or more other messages and/or other notifications to the user's cellular telephone, smart phone, computer, tablet, and/or other device of the vehicle user (for example, via a short range wireless (e.g. Bluetooth™), cellular, satellite, and/or wireless network) informing the user that an engagement of a vehicle door has been engaged and/or that an individual may be trapped inside the vehicle.

During step 332, a communication is provided to a third party (other than the user of the vehicle). In one embodiment, the communication is provided to a third party, such as a central server, monitoring service, security service, law enforcement, fire department, and/or public service who may able to assist, via instructions provided by the processor 242 of FIG. 2 to the transceiver 220 of FIG. 2 to transmit a telephone call, text message, e-mail, and/or one or more other messages and/or other notifications (for example, via a short range wireless (e.g. Bluetooth™), cellular, satellite, and/or wireless network) to such third party informing the third party that an engagement of a vehicle door has been engaged and/or that an individual may be trapped inside the vehicle. The third party may then contact the user and/or initiate appropriate actions to facilitate assistance with the situation.

In certain embodiments, an additional action is also taken (step 334). Specifically, in one embodiment, the action may comprise an unlocking and/or opening of one or more doors 170 of the vehicle. In one such embodiment, all of the locking mechanisms 182 of all of the doors 170 are unlocked. In certain of these embodiments, all of the doors 170 are also opened. In certain other embodiments, certain of the locking mechanisms 182 (e.g. the child locks 186) may be unlocked while other locking mechanisms 182 may not, and/or locking mechanisms 182 may not be unlocked. In addition, in certain embodiments, locking mechanisms 182 for some but not all of the doors 170 may be unlocked, and/or some but not all of the doors 170 may be opened. For example, in certain embodiments only the door 170 with an engaged apparatus is unlocked and/or opened, while in other embodiments additional doors 170 (or all of the doors) may be unlocked and/or opened. The actions of step 334 are preferably performed via instructions by the processor 142 of FIG. 2, for example to one or more locking mechanism 182, door handles 178, 180, and/or actuators controlling movement or operation thereof and/or of the door 170 itself The process then terminates.

With reference again to sub-process 316 above, if the door engagement condition(s) are not satisfied, then the process proceeds instead to the above-referenced step 336. For example, in one embodiment, as mentioned above, the process proceeds to step 336 if the determinations of any of steps 318, 320, and/or 322 are "no".

During step 336, a determination is made as to whether the timer of step 314 has exceeded a predetermined threshold. This determination is preferably made by the processor 242 of FIG. 2. The predetermined threshold is preferably stored as one of the stored values 254 in the memory 244 of FIG. 2. In one embodiment, the predetermined threshold is equal to fifteen minutes. However, this may vary in other embodiments.

If it is determined that the timer has exceeded the predetermined threshold, then an action is provided (step 338). In contrast to certain embodiments of step 334, during step 338 preferably only the child locks 186 are unlocked, and the doors 170 are not opened. This action is preferably performed via instructions provided by the processor 142 to the child locks 186 and/or an actuator controlling movement or operation thereof. The process then terminates. Conversely, if it is determined in step 336 that the timer has not exceeded the predetermined threshold, the process returns to step 318, and the timer remains set.

Accordingly, the process 300 provides for notification and/or actions if an engagement of a door apparatus is detected from inside the vehicle (sub-process 316), provided that one or more first conditions are also satisfied, such as the vehicle being stopped, each of the doors locked, and/or the alarm set (sub-process 306). This can help to facilitate assistance for an individual (such as a child) that may have inadvertently been left inside a vehicle with the child locks activated after the parents (and/or other users) have left the vehicle. The specific criteria may vary in certain embodiments. For example, in certain embodiments, the notifications and/or actions may be provided regardless of whether the child locks are activated. By way of further example, in certain embodiments the first condition(s) of sub-process 306 may be satisfied by a single criterion (e.g. if it is determined that the alarm has been set) and/or one or more other criteria (e.g. that the fob 187 has left its wireless range from the vehicle after the doors have been locked and the vehicle is stopped). By way of additional example, in certain embodiments the door apparatus engagement criteria may be satisfied by a single criterion (e.g. if a door handle 178 or locking mechanism 182 is engaged) and/or one or more other criteria is met (e.g. if someone is pushing against a door panel from inside the vehicle). In addition, it will be appreciated that in various embodiments not only the specific criteria may vary, but also the types of notifications and/or actions taken (and, for example, certain of the notifications and/or actions may be taken without other of the notifications and/or actions, and so on).

In addition, the process 300 also provides for unlocking of the child locks after a predetermined amount of time has elapsed after the vehicle stopped condition has been satisfied. This can also help to facilitate assistance for an individual (such as a child) that may have inadvertently been left inside a vehicle with the child locks activated after the parents (and/or other users) have left the vehicle. Similar to the discussion above, the specific criteria for this action may also vary in certain embodiments. For example, similar to the discussion above, the first condition of sub-process 306 triggering the timer may be satisfied by a single criterion (e.g. if it is determined that the alarm has been set) and/or one or more other criteria (e.g. that the fob 187 has left its wireless range from the vehicle after the doors have been locked and the vehicle is stopped). In addition, in certain embodiments, a timer may not be needed (for example, if the only notifications and actions are those set forth in steps 326-334). Similarly, in certain other embodiments, sub-process 316 may not be necessary (for example, if the only action is that set forth in step 338 based on the timer), and so on.

It will be appreciated that the disclosed methods, systems, and vehicles may vary from those depicted in the Figures and described herein. For example, the vehicle 100, control system 190, and/or various components thereof may vary from that depicted in FIGS. 1 and 2 and described in connection therewith. In addition, it will be appreciated that certain steps of the process 300 may vary from those depicted in FIG. 3 and/or described above in connection therewith. It will similarly be appreciated that certain steps of the process described above may occur simultaneously or in a different order than that depicted in FIG. 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

We claim:

1. A method for facilitating exit of a passenger inside a vehicle, comprising:
   determining whether a child lock of a vehicle is activated;
   determining whether a condition for the vehicle is satisfied, the condition selected from the group consisting of: an alarm of the vehicle has been set, the vehicle has been stopped, and all doors of the vehicle have been locked; and
   automatically deactivating the child lock a predetermined amount of time after the condition has been satisfied, to facilitate exit of the passenger inside the vehicle.

2. A system for facilitating exit of a passenger inside a vehicle, comprising:
- a sensor configured to detect when an apparatus of a door of a vehicle is engaged from inside the vehicle while the child lock is activated; and
- a processor coupled to the sensor and configured to at least facilitate:
  - determining, using a processor, whether the engagement of the apparatus of the door has occurred from inside the vehicle; and
  - providing an action for facilitating exit of the passenger inside the vehicle if, and only if, it is determined that the apparatus of the door is engaged from inside the vehicle while the child lock is activated.

3. The system of claim 2, wherein the apparatus comprises means to unlock or open a rear door of the vehicle.

4. The system of claim 2, wherein the processor is further configured to at least facilitate:
- determining whether a child lock of the vehicle is activated; and
- providing the action if it is determined that the apparatus of the door is engaged from inside the vehicle, provided further that it is determined that the child lock is activated.

5. The system of claim 2, wherein the processor is further configured to at least facilitate:
- determining whether an alarm of the vehicle is activated; and
- providing the action if it is determined that the apparatus of the door is engaged from inside the vehicle, provided further that it is determined that the alarm is activated.

6. The system of claim 2, wherein the processor is configured to at least facilitate providing an audio notification, a visual notification, or both, if it is determined that the apparatus of the door is engaged from inside the vehicle.

7. The system of claim 2, wherein the processor is further configured to at least facilitate contacting an authorized individual if it is determined that the apparatus of the door is engaged from inside the vehicle.

8. The system of claim 2, wherein the processor is further configured to at least facilitate deactivating a child lock of the door a predetermined amount of time after the apparatus of the door is engaged from inside the vehicle.

9. The system of claim 2, wherein the processor is configured to at least facilitate automatically unlocking the door, automatically opening the door, or both, if it is determined that the apparatus of the door is engaged from inside the vehicle.

* * * * *